United States Patent [19]

Washizaki

[11] Patent Number: 5,158,639

[45] Date of Patent: Oct. 27, 1992

[54] ROLL CONVEYANCE AND ATTACHMENT/DETACHMENT DEVICE FOR APPLYING APPARATUS

[75] Inventor: Yoji Washizaki, Saitama, Japan

[73] Assignee: Somar Corporation, Tokyo, Japan

[21] Appl. No.: 666,774

[22] Filed: Mar. 8, 1991

[30] Foreign Application Priority Data

Jun. 1, 1990 [JP] Japan ................. 2-143523

[51] Int. Cl.$^5$ ............................................. B32B 35/00
[52] U.S. Cl. ............................ 156/517; 156/510;
  187/10; 187/38; 187/39; 187/116; 414/639;
  414/643; 414/662; 414/785; 414/911
[58] Field of Search ............... 414/911, 643, 785, 639,
  414/662; 187/10, 116, 38, 39; 156/517, 510

[56] References Cited

U.S. PATENT DOCUMENTS

| | | | |
|---|---|---|---|
| 791,478 | 6/1905 | Lower | 414/643 |
| 2,452,084 | 10/1948 | Tomlin | 414/643 |
| 3,180,513 | 7/1963 | Vander Wal | 414/643 |
| 3,561,620 | 2/1971 | Willis | 414/282 |
| 3,674,159 | 7/1972 | Lemelson | 414/283 |
| 3,876,039 | 4/1975 | Bushnell, Jr. | 414/785 |
| 4,755,099 | 7/1988 | Belveal | 414/911 |
| 4,851,073 | 7/1989 | Satou | 156/517 |

FOREIGN PATENT DOCUMENTS 63-117489  5/1988  Japan .

Primary Examiner—David A. Simmons
Assistant Examiner—Merrick Dixon
Attorney, Agent, or Firm—Sughrue, Mion, Zinn, Macpeak & Seas

[57] ABSTRACT

A roll conveyance device for conveying rolls and attaching or detaching the rolls in a roll applying apparatus includes guide pillars, and a roll rest having a plane on which a plurality of the rolls are positioned. The roll rest is movably supported by the guide pillars and has two mutually divisible sections so that the roll rest is foldable. A roll rest moving device vertically moves the roll rest.

4 Claims, 6 Drawing Sheets

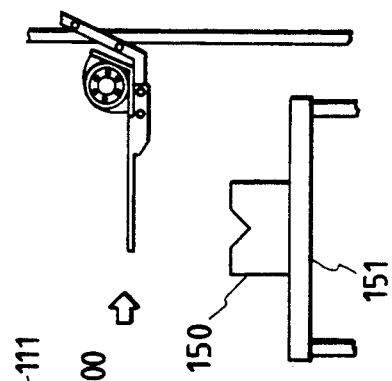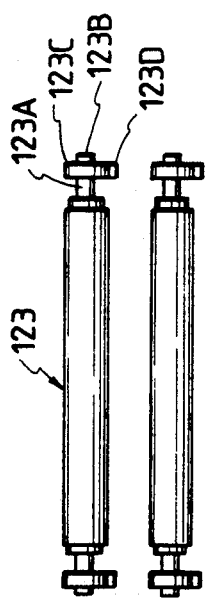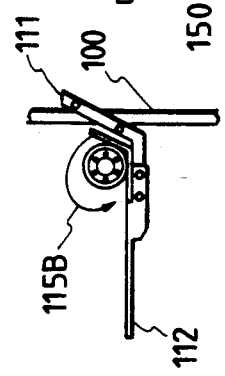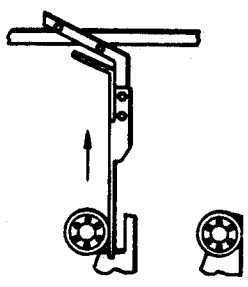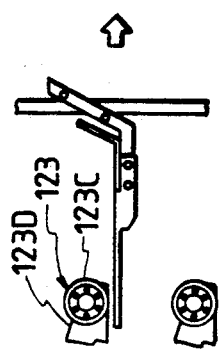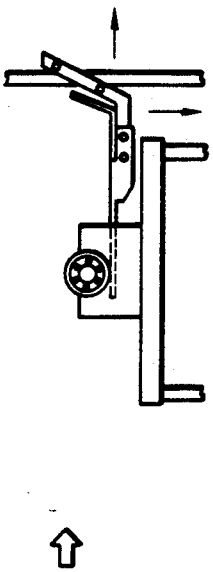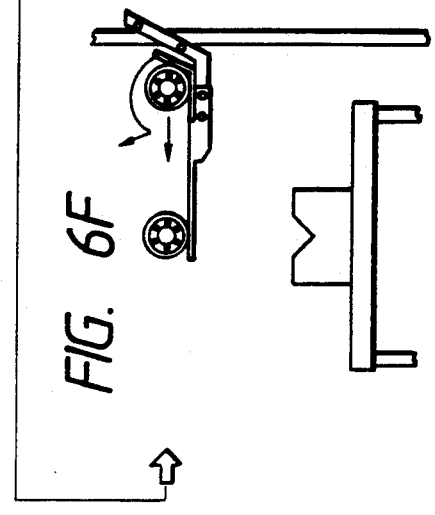

ROLL CONVEYANCE AND ATTACHMENT/DETACHMENT DEVICE FOR APPLYING APPARATUS

The present invention relates to a roll conveyance and attachment/detachment device, and more particularly to a device for conveying continuous film rolls or pressure applying rolls and attaching or detaching the rolls in an applying apparatus which functions so that stratified films, each consisting of a photosensitive resin layer and a light-transmissible resin film, are cut off to a prescribed length corresponding to that of a panel and are then applied to film sticking surfaces of the panel by the pressure applying rolls.

BACKGROUND OF THE INVENTION

When films are to be applied to the top and bottom of a panel by an applying apparatus, film rolls are installed in the upper and lower portions of the body of the apparatus. A system relating to the installation of the film rolls was disclosed in Japanese Patent Application (OPI) No. 117489/88 (the term "OPI" as used herein means an "unexamined published application"). Conventionally, the upper and the lower film rolls are carried and moved upwardly and downwardly by an operator's hands, and pressure applying rolls also are carried and moved upwardly and downwardly by the operator's hands during replacement thereof.

If the width of each of the films of the film rolls which are to be carried and moved upwardly and downwardly in the conventional manner, or if the number of windings of each of the films and the length of each of the pressure applying rolls which are to be carried and moved upwardly and downwardly in the conventional manner are so large that each of the film rolls is too heavy to be installed on the upper and lower film roll support portions of the applying apparatus by a single person or if each of the pressure applying rolls is too heavy to be replaced by a single person, a problem arises in that several persons are needed for the roll installation and replacement operations.

The present invention was designed to solve this problem.

SUMMARY OF THE INVENTION

Accordingly, it is an object of the present invention to provide a system which minimizes the labor required for the attachment or detachment of film rolls, and pressure applying rolls in an applying apparatus, which functions so that each of a plurality of continuous films are cut off to a prescribed length corresponding to that of a panel and the cut-off films are then adhered to the film sticking surfaces of the panel by the pressure applying rolls.

It is another object of the present invention to provide a roll conveyance and attachment/detachment device which is for an applying apparatus and which functions so that two film rolls or pressure applying rolls are placed together and conveyed, one of the rolls is then attached and the second roll is thereafter attached.

The roll conveyance and attachment/detachment device provided according to the present invention is to be used in an applying apparatus which cuts off each of a plurality of continuous films to a prescribed length corresponding to that of a panel and which then applies the cut-off films to the film sticking surfaces of the panel. The inventive device includes a roll rest, having positioned thereon two of the continuous film rolls or the pressure applying rolls, and which is movably supported by support pillars, and a roll rest moving means for vertically moving the roll rest, wherein the roll rest has two mutually divisible sections so that the roll rest can be folded. Another feature of the device has the front half section of the roll rest being slidable. The device has yet another feature of the roll rest moving means including an electric motor and a speed controller for the motor.

With the roll conveyance and attachment/detachment device provided according to the present invention, the two film rolls, which are installed in the upper and lower portions of the body of the applying apparatus, or the two pressure applying rolls can be placed on the roll rest. The front half section of the roll rest is foldable or slidable. The roll rest can be electrically moved upwardly and downwardly, and the movement speed thereof can be appropriately set by the speed controller. As a result, film rolls or pressure applying rollers of various sizes can be automatically placed in attachment and detachment positions in the body of the applying apparatus. Thus, the rolls can be safely and quickly replaced by a minimum of labor.

BRIEF DESCRIPTION OF THE DRAWINGS

The above-mentioned and other objects and novel features of the present invention will become more apparent from the following detailed description herein when read in conjunction with the accompanying drawings wherein:

FIGS. 6A-6G are explanatory views of a heat and pressure applying roller and the attachment/detachment thereof to the applying apparatus by the roll conveyance attachment/detachment device of the invention.

DETAILED DESCRIPTION OF THE PREFERRED EMBODIMENT

Figure 1:
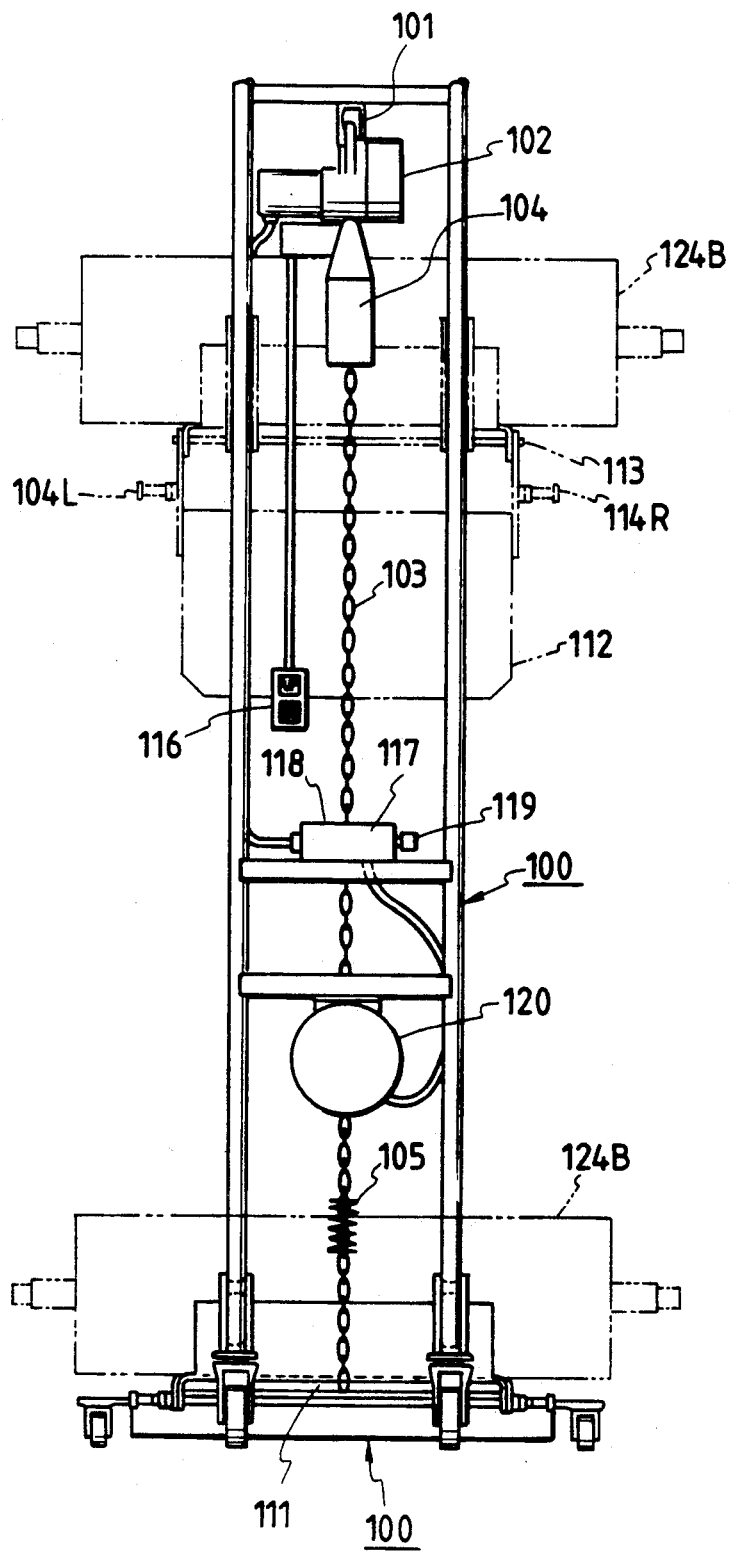
FIG. 1 is a rear view of a roll conveyance and attachment/detachment device according to the present invention and which is for use with an applying apparatus.

An embodiment of the present invention is hereafter described in detail with reference to the drawings attached hereto. Equivalents shown in the drawings are denoted by the same reference symbols therein and, for convenience, are not repeatedly described in detail.

As shown in FIG. 1, the body 100 of the roll conveyance and attachment/detachment device includes casters, the movement directions of which can be optionally changed to move the device in a desired direction. A hoist attaching member 101 is welded to the central part of the upper portion of the device body 100. A hoist 102 is secured to the attaching member 101. Electric wires for a switch 116 for moving the hoist 102 either upwardly or downwardly extend out of the hoist. The switch 116 is located at the central portion of the device body 100. The hoist 102 is engaged with a drive chain 103 secured at one end thereof to the center of the rear of a secured section 111 of the roll rest of the invention, and is located at the other end thereof in a chain bag 104 hung from the lower portion of the hoist 102. The lower portion of a chain limit member 105 is secured by a screw to the drive chain 103 slightly over its portion secured to the secured section 111 of the roll rest. The chain limit member 105 includes a spring and a disk secured thereto. A limit switch provided at the lower portion of the hoist 102 (not shown in the drawings) is actuated when the limit switch is pushed by the disk of the chain limit member 105. A control box 117 is secured by screws to a position near the center of the rear portion of the device body 100. A switch (not shown in the drawings) for changing speeds (e.g., a high speed to a low speed and vice versa) is located on top of the control box 117. A low-speed control knob 119 is provided on the right side of the control box 117 with regard to FIG. 1. A power supply cord box 120, accommodating a power supply cord therein, is attached to the device body 100 under the control box 117.

The constitution of the roll rest is described with reference to FIG. 3 hereinafter. Moving rollers 107R and 107L are provided behind the guide pillars 106R and 106L of the body 100 of the device. Other moving rollers 108R and 108L are provided under the moving rollers 107R and 107L. Moving rollers 107R, 107L, 108R, and 108L are rotatably supported with roller shafts 109 and are secured by screws to right and left roll rest support members 110 extending obliquely upward. The secured section 111 of the roll rest is welded to horizontal members 110A coupled to the roll rest support members 110. The secured section 111 extends obliquely upward at a portion thereof facing the guide pillars 106R and 106L, and is bent downwardly at right and left front portions of the secured section 111. The right and left downwardly bent portions of the secured section 111 have through holes. The right and left front parts of the horizontal portion of the secured section 111 have film roll securing holes 128 for securing film rolls 124B with belts. The section 111 has other film roll securing holes 128 at the edges of the right and left parts of the obliquely extending portion of the section.

The right and left portions of a foldable section 112 of the roll rest are bent downwardly from the horizontal portion of the rest, project backwardly, and have through holes at the rear ends of the right and left portions and tapped holes at the centers of the right and left portions. A support shaft 113 for supporting the foldable section 112 of the roll rest extends through the rear through holes of the right and left portions of the secured section 111 of the roll rest and through the through holes of the right and left portions of the foldable section 112. Shaft stop rings are attached to the portions of a support shaft 113 which project from the through holes of the foldable section 112 of the roll rest. Engagement knobs 114R and 114L are screw-engaged in the tapped holes of the downwardly bent right and left portions of the foldable section 112 so that the engagement portions of the knobs are inserted into the front through holes of the right and left portions of the secured section 111. When the engagement knobs 114R and 114L are pulled outwardly, the engagement portions of the knobs, which are inserted into the front through holes of the right and left portions of the secured section 111, disengage so that the foldable section 112 of the roll rest can be swung about the support shaft 113, thereby being folded.

When the roll rest is to be moved upwardly or downwardly, the hoist 102 is driven so that the drive chain 103 coupled to the hoist is wound upwardly or unwound downwardly and the moving rollers 107R, 107L, 108R, and 108L, provided at the roll rest support members 110, roll. Thus, the roller rest is moved upwardly or downwardly.

Hereinafter, an exemplary procedure of using the roll conveyance attachment/detachment device is described with reference to FIG. 2. A film roll 124B is placed on the secured section 111 of the roll rest. Belts 115B for securing the film roll 124B are laid thereon, and both ends of the belts are secured to the film roll securing holes 128. Thereafter, another film roll 124A is positioned on the foldable section 112 of the roll rest and belts 115A for securing the film roll 124A are laid thereon, and both ends of the belts are secured to film roll securing holes 127. The film rolls 124A, 124B are prefitted with mandrels. The length of each of the belts 115A, 115B for securing the film rolls 124A, 124B, respectively, can be freely changed by a desired quantity. After the film rolls 124A, 124B are secured to the roll rest, the device is moved to the front of the applying apparatus body as the inlet conveyor of the apparatus remains idle.

Figure 2:
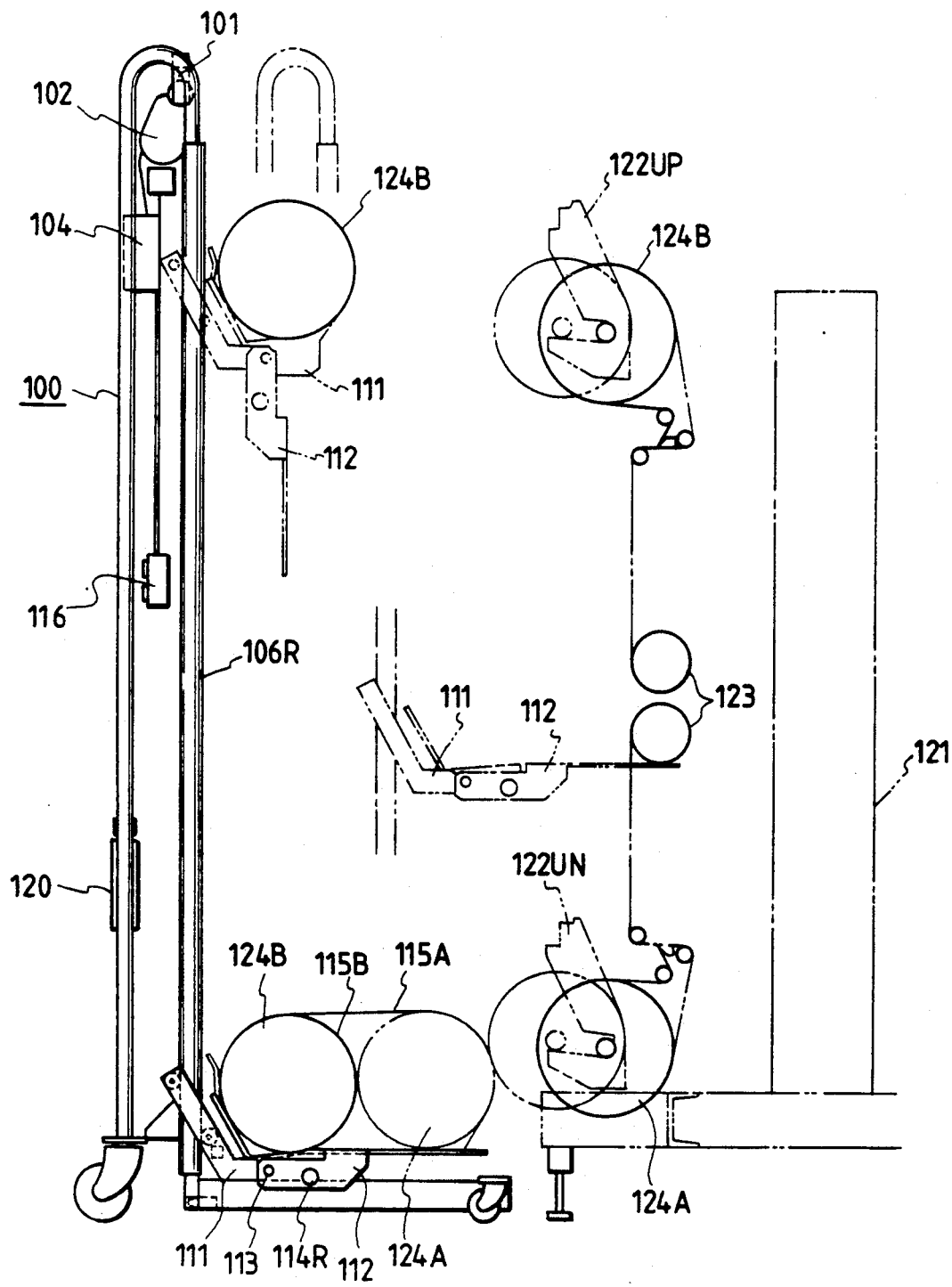
FIG. 2 is a side view of the device as seen from the right side of FIG. 1.

Thereafter, the roll rest is moved at low speed so that the mandrel fitted to the film roll 124A on the roll rest is located slightly higher than the mandrel fitting portions of the lower film roll support members 122UN of the applying apparatus, as shown in FIG. 2. Thereafter the entire device is pushed in so that the mandrel fitted to the film roll 124A is located on the lower film roll support members 122UN slightly inside the ends thereof. The belts 115A which secure the film roll 124A are then loosened and removed therefrom. The roll rest is then slightly moved down at low speed.

After confirming that the mandrel is fitted to the film roll 124A and both ends of the mandrel are located onto the right and left lower film roll support members 122UN of the applying apparatus, the roll rest is moved downwardly further at low speed. Since the lower and upper film roll support members 122UN and 122UP of the applying apparatus are inclined slightly backward so that the roll rest moves out of contact with the film roll 124A as the roll rest is moved downwardly, the film roll rolls spontaneously and inwardly at the lower film roll support member 122UN and finally reaches a lower film roll set position in the applying apparatus. Thus, attaching the lower film roll 124A in the lower film roll set position is completed.

Thereafter, the device is pushed out to its original position (i.e., to where it was before being pushed in). The roll rest is then moved up at high speed and stopped at a position at the middle of the device. The right and left engagement knobs 114R and 114L of the roll rest are pulled outwardly so that the foldable section 112 of the roll rest is folded. The roll rest is further moved up and stopped at a position so that the mandrel fitted to the upper film roll 124B is located slightly above the mandrel fitting portions of the upper film roll support members 122UP of the applying apparatus, as shown in FIG. 2. The same operation as the above-described attachment of the lower film roll 124A is then performed so that the upper film roll 124B is attached in an upper film roll set position in the applying apparatus.

Referring to FIGS. 6A-6G and as discussed in detail hereinbelow, when the heat and pressure applying rollers 123, shown in FIG. 2, of the applying apparatus are to be attached or detached by using the roll conveyance attachment/detachment device of the invention, the foldable section 112 of the roll rest is positioned horizontally.

Each of the heat and pressure applying rollers 123 generally comprise a metal hollow cylindrical member covered at its outer surface with a thin synthetic rubber layer, a hollow outer shaft 123A inserted into and securely fixed to the cylindrical member so that end portions thereof are exposed from the cylindrical member, and an inner shaft 123B fitted through ring-like ball bearings on the inside of the outer shaft so as to allow mutual rotation between the outer shaft and the inner shaft. The ball bearings are positioned near the end portions of the inner shaft, which are exposed from the outer shaft.

Gear wheels are securely attached to portions near the right and left ends of the outer shaft, so as to transmit the rotational torque from a drive system (not shown in the drawings) to the outer shaft, thereby controlling the rotation or halting of the heat and pressure applying rollers.

The operation of attaching and detaching the heat and pressure applying rollers 123 of the applying apparatus by using the roll conveyance attachment/detachment device of the invention will now be discussed First, for purposes of explanation, it is assumed that a condition exists in which the heat and pressure applying rollers are already attached to the body of the applying apparatus, and thus the inner shaft of a heat and pressure applying roller is securely fixed by screws to an inner shaft fixing block 123C securely provided on a heat and pressure applying roller support member 123D of the applying apparatus.

To detach a heat and pressure applying rollers from the applying apparatus, a screw of the fixing block for fixing the inner shaft of the heat and pressure applying roller to the heat and pressure applying roller support member is unscrewed. The foldable section 112 of the roll rest of the roll conveyance attachment/detachment device is positioned horizontally (e.g., not folded). The position of the foldable section 112 is adjusted by switch 116 for moving the hoist 102, so that the upper surface of the foldable section 112 is positioned at a level slightly lower than the lower surface of the heat and pressure applying roller 123.

Thereafter, the roll conveyance attachment/detachment device is moved toward the heat and pressure applying roller. Then, the tip (distal) end of the foldable section 112 is inserted under the heat and pressure applying roller 123, and the movement of the device is halted when the device reaches a position at which the heat and pressure applying roller can rest on the foldable section 112. Since a position of the upper surface of the foldable section 112 is slightly lower than that of the lower surface of the heat and pressure applying roller, the foldable section 112 can be inserted under the heat and pressure applying roller without rubbing each other.

Then, the foldable section 112 is slightly moved up (approximately 10 mm) by operating switch 116, so that the heat and pressure applying roller 123 rests on the foldable section 112. The heat and pressure applying rollers on the foldable section 112 is rolled and moved toward the secured section 111 of the roll rest, so that the belts 115B, shown in FIG. 2, are set thereon for securing the heat and pressure applying rollers on the secured section 111. Then, the entire roll conveyance attachment/detachment device is moved away from the applying apparatus.

Thereafter, V-blocks 150 for receiving the inner shaft of the heat and pressure applying rollers are provided on a working table 151, and the entire device is moved so that the foldable section 112 is located above the V-blocks 150. The belts 115B securing the heat and pressure applying roller to the secured section 111 is detached therefrom, and the heat and pressure applying rollers are rolled and moved toward the foldable section.

Then, the foldable section 112 is moved downwardly by operating the switch 116 while an operator manually holds the heat and pressure applying roller on the foldable section 112. Thereafter, the downward movement of the foldable section 112 is stopped when the shaft of the heat and pressure applying rollers are located on the V-blocks 150. The foldable section 112 of the roll rest is removed therefrom, and the operation for detaching the heat and pressure applying roll is completed.

To attach the heat and pressure applying rollers onto the applying apparatus, the above-described steps utilized in detaching the heat and pressure applying roller are performed in reverse order.

Thus, since a portion of the inventive roll rest is foldable, the present invention can be utilized efficiently for attaching and detaching a film roll, and the film roll can be prevented from being rolled and moved on the roll rest. Thus, the rolling and movement of the film roll on the roll rest encountered in conventional systems, and which results in damage to the film surface of the film rolls thereon, can be prevented. However, when the device is utilized for detaching and attaching the heat and pressure applying roller, since a gap between an upper heat and pressure applying roller and a lower heat and pressure applying roller is very small, the roll rest cannot be inserted into the gap when the foldable section 112 is folded. Accordingly, when the device is utilized for the heat and pressure applying roller, the foldable section 112 of the roll rest is positioned horizontally.

Figure 3:
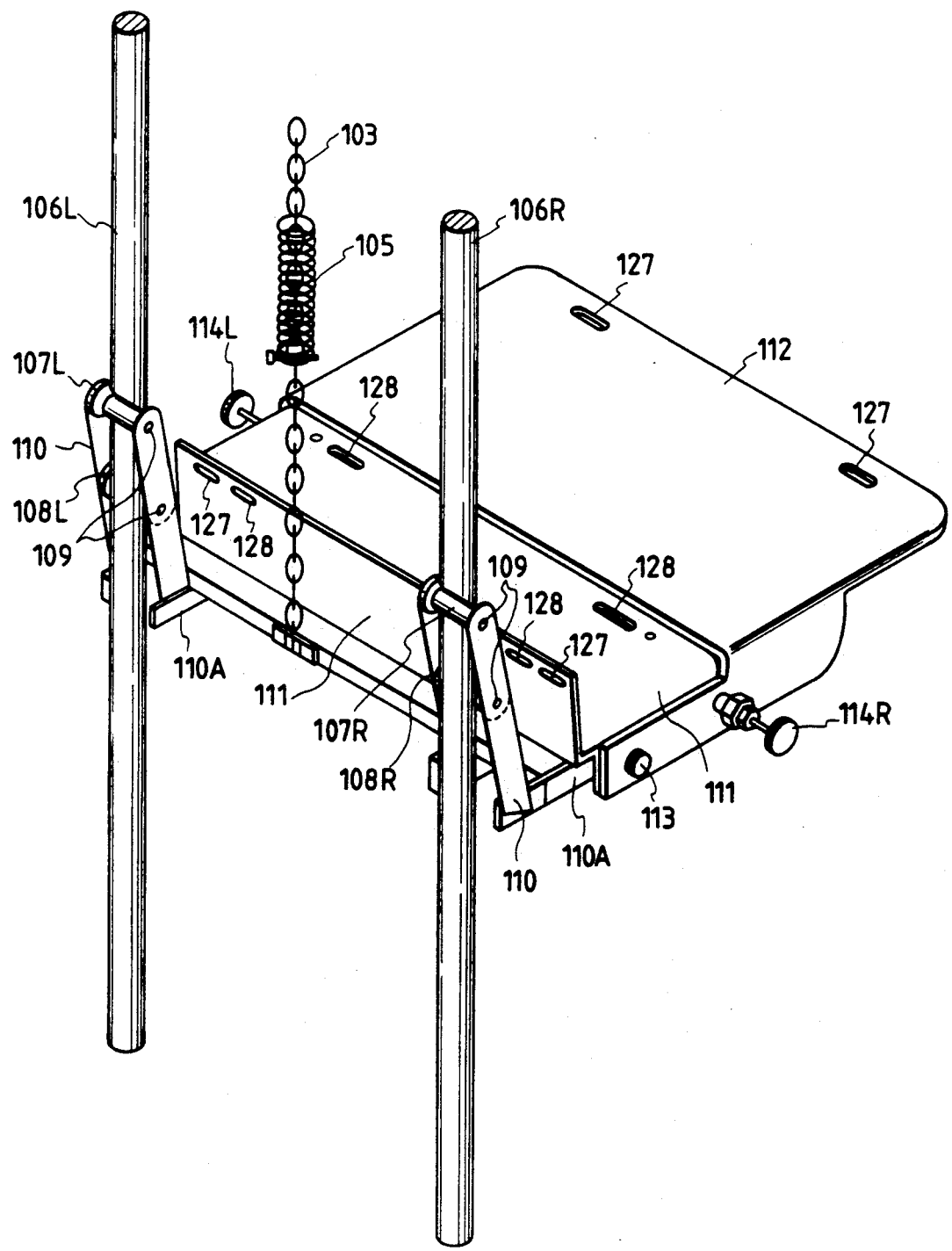
FIG. 3 is an enlarged perspective view of the roll rest of the device.
Figure 4:
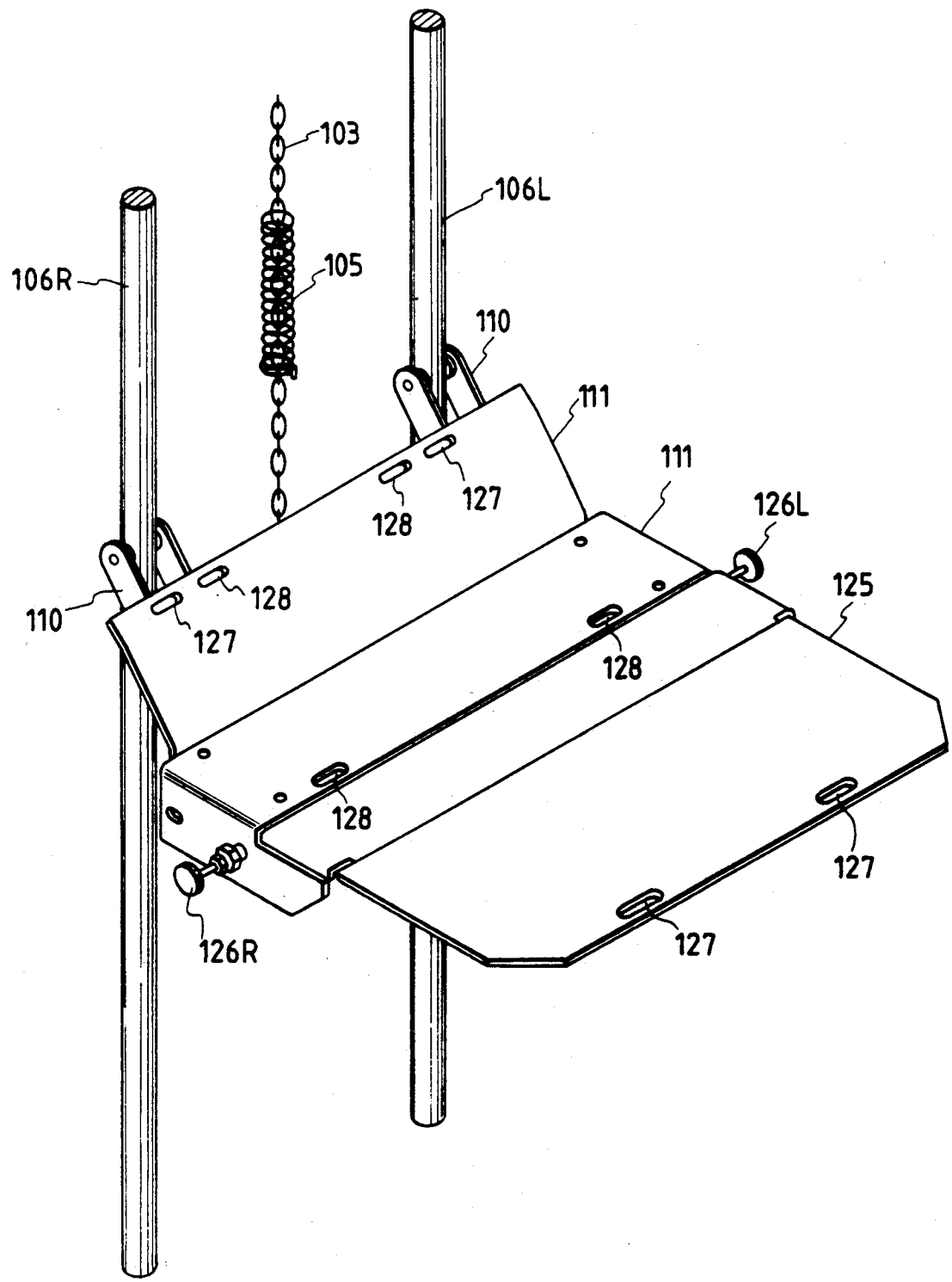
FIG. 4 is a perspective view of a roll rest which is a modification of that shown in FIG. 3.

FIG. 4 is an enlarged perspective view of a roll rest which is a modification of the roll rest shown in FIG. 3. The front half section of the roll rest shown in FIG. 4 is slidable. The roll support slidable section of the roll rest is made of a roll bearing plate 125, which is slidable under the secured section 111 of the roll rest when the engagement knobs 126R, 126L thereof are pulled outwardly.

Figure 5:
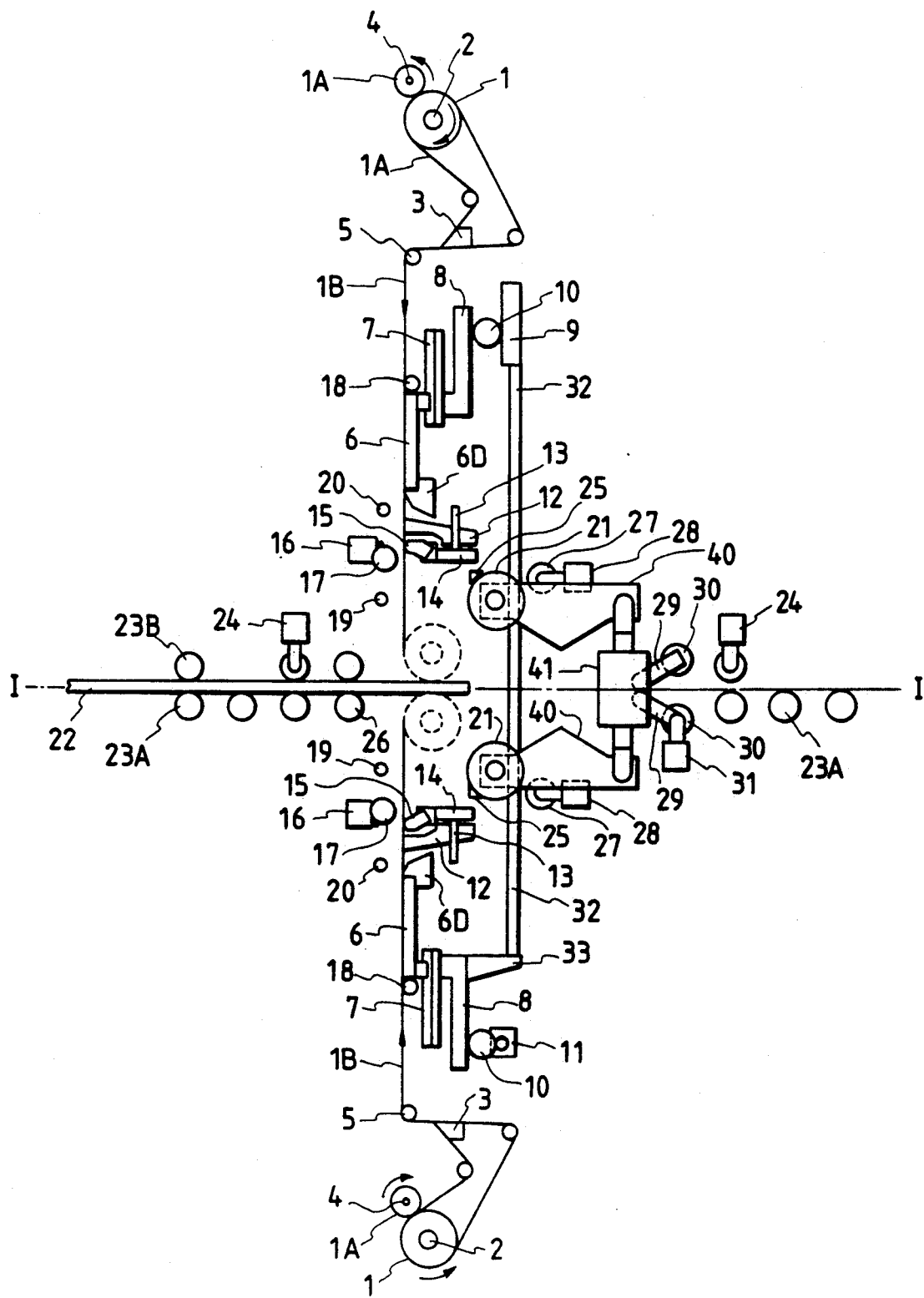
FIG. 5 is a side view of the applying apparatus.

FIG. 5 is a side view of the applying apparatus and provides an explanatory view for describing the feed of the films. In the applying apparatus, three-layer stratified films 1, each consisting of a light-transmissible resin film, a photosensitive resin layer and another light-transmissible resin film, are continuously wound on supply rolls 2 in advance. The stratified film 1 from each of the supply rolls 2 is separated, by a film separation member 3, into a light-transmissible resin film 1A (which is a protective film) and a stratified film 1B consisting of the other light-transmissible resin film and the photosensitive resin layer exposed on its side to be applied to the panel. The separated light-transmissible resin film 1A is wound on a winding roll 4. A pair of these winding rolls 4 is provided not only above and below a panel conveyance passage I—I, but the supply rolls 2 as well.

The leading edge of the separated stratified film 1B is fed to a main vacuum suction plate 6, which is a film feed member and which has a leading end portion 6D, along a tension roll 5. A static electricity eliminator for the film IB is provided near the main vacuum suction plate 6. The plate 6 is vertically movable toward and away from the application position of the stratified films 1B to the panel. The plate 6 is slidably fitted on guide rails 7 attached to a support plate 8 for the main vacuum suction plate 6. The support plate 8 is coupled with a rack (not shown in FIG. 5) and a pinion 10 to a mounting frame attached to the applying apparatus body. The pinion 10, engaged with a rack provided on a coupling rod 32, is used to move the support plates 8 of the upper and lower main vacuum suction plates 6 and is connected to a drive motor 11.

A film holding member 12 for winding the leading edge portion of the film IB is fitted on horizontal guide rails on the support plate 8 supporting the main vacuum suction plate 6, and is provided with a coupling notched member in which a coupling rod 13 is fitted. The coupling rod 13 is attached to a support member 14 supporting a fixed cutting member 15. A rotary cutting member 17 is rotatably supported by a support member 16. The cutting edge of the rotary cutting member 17 extends obliquely at a prescribed angle. Air blowoff pipes 19 and 20 for blowing air to the stratified film 1B are provided above and below the support member 16 for the rotary cutting member 17.

FIG. 5 also shows the pressure applying rolls 21, the panel 22 for the printed circuit board, driving rolls 23A, driven rolls 23B, panel holders 24 each including a panel holding roll and a pneumatic cylinder for vertically moving the holding roll, vacuum suction bars 25, wetting rolls 26, pressure applying roll wiping rolls 27, pneumatic cylinders 28 for the wiping rolls, wiping roll kinematic coupling and holding members 29, panel wiping rolls 30, pneumatic cylinders 31 for the panel wiping rolls, coupling rod attaching members 33, pressure applying roll support members 40, and pneumatic cylinders 41 for vertically moving the pressure applying rolls.

When the stratified films 1B are to be applied to the panel 22, the films are positioned along the direction of the conveyance of the panel 22 between the upper and the lower pressure applying rolls 21, the panel is conveyed in between the mutually-facing applied sides of the films, the pressure applying rolls are put into pressure contact with the films, and the panel is conveyed between the pressure applying rolls. Thus, the stratified films 1B are applied to the panel 22.

According to the present invention, film rolls or pressure applying rolls, which have various sizes, can be automatically set in attached or detached positions in an applying apparatus. Thus, attaching the film rolls or replacing the pressure applying rolls with others can be safely and quickly performed by a minimum of labor.

The present invention is not confined to the embodiment described above, but may be embodied or practiced in other various ways without departing from the spirit or essential character thereof. Thus, the scope of the invention should be considered as limited only by the appended claims.

I claim:

1. A roll conveyance device for conveying rolls and attaching or detaching said rolls in an applying apparatus, said roll conveyance device comprising:
    guide pillars;
    a plurality of rollers engageable with said guide pillars from opposite sides thereof;
    a roll rest, movably supported by said guide pillars through said plurality of rollers, having a plane on which a plurality of said rolls are positioned; and
    a plurality of roll rest support members having first and second ends, said roll rest support members extending obliquely and rotatably supporting said plurality of rollers on said first end, and fixedly supporting said roll rest on said second end; and
    a roll rest moving means, coupled to said roll rest, for vertically moving said roll rest to convey said rolls positioned on said roll rest for attachment or detachment in said applying apparatus, wherein said roll rest has two mutually divisible sections so that said roll rest is foldable, and wherein said two mutually divisible sections of said roll rest include a secured section and a foldable section, said foldable section being movable between first and second positions, said roll rest carrying a first quantity of rolls when said foldable section is in said first position, and said roll rest carrying a second quantity of rolls when said foldable section is in said second position.

2. A device according to claim 1, wherein said roll rest has through holes positioned at a first end and a second end thereof, said through holes being adapted for use with a wire inserted therethrough to hold said rolls positioned on said roll rest.

3. A device according to claim 1, wherein said roll rest comprises engagement knobs, engageable with said secured section and said foldable section, and wherein said foldable section of said roll rest is foldable by means of said engagement knobs being pulled outwardly and said foldable section being swung about said support shaft.

4. A roll conveyance device as defined by claim 1, wherein said secured section is adapted to carry a roll when said foldable section is in either of said first and second positions.

* * * * *